United States Patent
Raban et al.

(10) Patent No.: US 9,935,903 B2
(45) Date of Patent: Apr. 3, 2018

(54) DUPLICATE-FREE ITEM CREATION USING EWS BY A SINGLE CLIENT

(71) Applicant: Check Point Software Technologies Ltd., Tel-Aviv (IL)

(72) Inventors: Yuval Raban, Rehovot (IL); Leo Natan, Tel Aviv (IL); Ori Feldman, Ramat-Gan (IL)

(73) Assignee: Check Point Software Technologies Ltd, Tel Aviv (IL)

(*) Notice: Subject to any disclaimer, the term of this patent is extended or adjusted under 35 U.S.C. 154(b) by 706 days.

(21) Appl. No.: 14/501,085

(22) Filed: Sep. 30, 2014

(65) Prior Publication Data

US 2016/0094682 A1   Mar. 31, 2016

(51) Int. Cl.
H04L 29/06 (2006.01)
H04L 12/58 (2006.01)

(52) U.S. Cl.
CPC .......... H04L 51/046 (2013.01); H04L 51/14 (2013.01)

(58) Field of Classification Search
CPC ...... G06F 9/541; G06F 8/65; G06F 17/30557; G06F 17/30; H04L 51/046; H04L 29/06; H04L 29/08072; H04L 29/0809; H04L 67/1014; H04L 51/18; H04L 51/12; H04L 51/22; H04L 51/24; H04L 41/0213; H04L 41/0686; H04L 43/0817; H04L 51/14; G06Q 10/06; G06Q 10/107; G06Q 10/0631
See application file for complete search history.

(56) References Cited

U.S. PATENT DOCUMENTS

| | | | | |
|---|---|---|---|---|
| 6,549,957 B1* | 4/2003 | Hanson | ................ | G06Q 10/107 709/206 |
| 2003/0055903 A1* | 3/2003 | Freed | .................... | H04L 51/12 709/206 |
| 2007/0130255 A1* | 6/2007 | Wolovitz | ................ | H04L 51/38 709/204 |
| 2011/0261701 A1* | 10/2011 | Coates | ................ | H04L 43/0817 370/242 |
| 2013/0191509 A1* | 7/2013 | Loughry | ................. | G06F 9/541 709/219 |
| 2013/0198363 A1* | 8/2013 | Kolluru | ................... | H04L 67/22 709/224 |
| 2014/0006498 A1* | 1/2014 | Liu | ........................ | H04L 67/02 709/204 |

* cited by examiner

*Primary Examiner* — Kevin Bates
*Assistant Examiner* — Ranjan Pant
(74) *Attorney, Agent, or Firm* — Mark M. Friedman

(57) ABSTRACT

Processing client requests for duplicate-free server operations is particularly useful for creating and sending items using Microsoft Exchange Web Services (EWS). The system facilitates avoiding creation and sending of duplicate items. In contrast to conventional implementations that send a single command to create and then perform subsequent processing of an item, a feature of the present embodiment is using two commands: a first command to create the item, and a second command to subsequently process the item. In a specific implementation, an EWS item's provided ChangeKey property is used to keep track of the EWS's reply from the server to the client, thereby avoiding duplicate item creation.

17 Claims, 4 Drawing Sheets

DUPLICATE-FREE ITEM CREATION USING EWS BY A SINGLE CLIENT

FIELD OF THE INVENTION

The present invention generally relates to Microsoft Exchange Web Services (EWS), and in particular, it concerns duplicate-free item creation.

BACKGROUND OF THE INVENTION

Microsoft Exchange Web Services (EWS) provides the functionality to enable client applications to communicate with an Exchange server. EWS provides access to much of the same data that is made available through Microsoft Office Outlook. EWS clients can integrate Outlook data into Line-of-Business (LOB) applications. Simple Object Access Protocol (SOAP) provides the messaging framework for messages sent between the client application and the Exchange server. The SOAP messages are typically sent by Hypertext Transfer Protocol (HTTP). EWS's application programming interface (API) provides clients with easy access to an Exchange server's data, as well as an API for data manipulation, such as creating items, for example, emails and meetings. An Exchange server's data is also referred to as an Exchange store. A well-known API call is the "CreateItem" operation that creates items in the Exchange store. API calls are also referred to as operations, commands, and requests. The CreateItem call can be used to create items such as calendar items, email messages, meeting requests, tasks, and contacts.

When creating items, for example, sending emails, an important requirement is that recipients do not receive the same item multiple times. Such an issue is avoided in most mail/calendar clients as a built in feature. The use of the EWS API does not provide for this native approach.

For example, when using the EWS API, a user may send an email, and then the connection from the user's client machine to the EWS server times out. In this example, if the email was successfully sent from the server, the client does not have confirmation that the email was sent, and sends the email again. The recipient will then receive two emails. In a second example, a meeting calendar item is sent from a user to multiple recipients, and the connection from the user's client machine to the EWS server is aborted by client. In this second example, another invitation is sent, resulting in duplicate meeting requests.

SUMMARY

Embodiments of the present invention are directed methods of creating items using EWS to avoid creating duplicate items.

According to the teachings of the present embodiments there is provided a method for processing client requests for server operations, including the steps of: issuing a create request to create and save an item, wherein the item is to be processed; checking if a confirmation is received in response to the issuing; if the confirmation is received, issuing a second command to process the item; else issuing a find command to determine if the item has been created; and if the find command determines that the item has been created, issuing the second command to process the item, else repeating the issuing a create request.

According to the teachings of the present embodiment there is provided a system including: a processing system containing one or more processors, the processing system being configured for: issuing a create request to create and save an item, wherein the item is to be processed; checking if a confirmation is received in response to the issuing; if the confirmation is received, issuing a second command to process the item; else issuing a find command to determine if the item has been created; and if the find command determines that the item has been created, issuing the second command to process the item, else repeating the issuing a create request.

In an optional embodiment, the create request includes an item name and item value. In another optional embodiment, the item name is selected from the group consisting of:
  (a) a constant string;
  (b) a constant string unique in context of use of the item name;
  (c) an ExtendedFieldURI PropertyName; and
  (d) a Custom Property Key (CPK).

In another optional embodiment, the item value is selected from the group consisting of:
  (a) a unique value arbitrarily generated for the create request;
  (b) an ExtendedFieldURI DistinguishedPropertySetId;
  (c) a Custom Property Value (CPV); and
  (d) a CPV randomly generated as a client id (CID).

In another optional embodiment, the confirmation includes an item identification (ItemId), the second command includes the ItemId, and if the find command determines that the item has been created, receiving a find command result including the ItemId.

In another optional embodiment, the item is an email message and the second command is a send operation. In another optional embodiment, the item is a calendar item and the second command is an update operation. In another optional embodiment, the issuing is from a client to an Exchange Web Services (EWS) server.

According to the teachings of the present embodiment there is provided a computer-readable storage medium having embedded thereon computer-readable code for processing client requests for server operations, the computer-readable code including program code for: issuing a create request to create and save an item, wherein the item is to be processed; checking if a confirmation is received in response to the issuing; if the confirmation is received, issuing a second command to process the item; else issuing a find command to determine if the item has been created; and if the find command determines that the item has been created, issuing the second command to process the item, else repeating the issuing a create request.

According to the teachings of the present embodiment there is provided a computer program that can be loaded onto a server connected through a network to a client computer, so that the server running the computer program constitutes a server in a system according to any one of the above claims.

According to the teachings of the present embodiment there is provided a computer program that can be loaded onto a computer connected through a network to a server, so that the computer running the computer program constitutes a client computer in a system according to any one of the above claims.

BRIEF DESCRIPTION OF FIGURES

The embodiment is herein described, by way of example only, with reference to the accompanying drawings, wherein.

DETAILED DESCRIPTION

FIGS. 1-5

Figure 1:
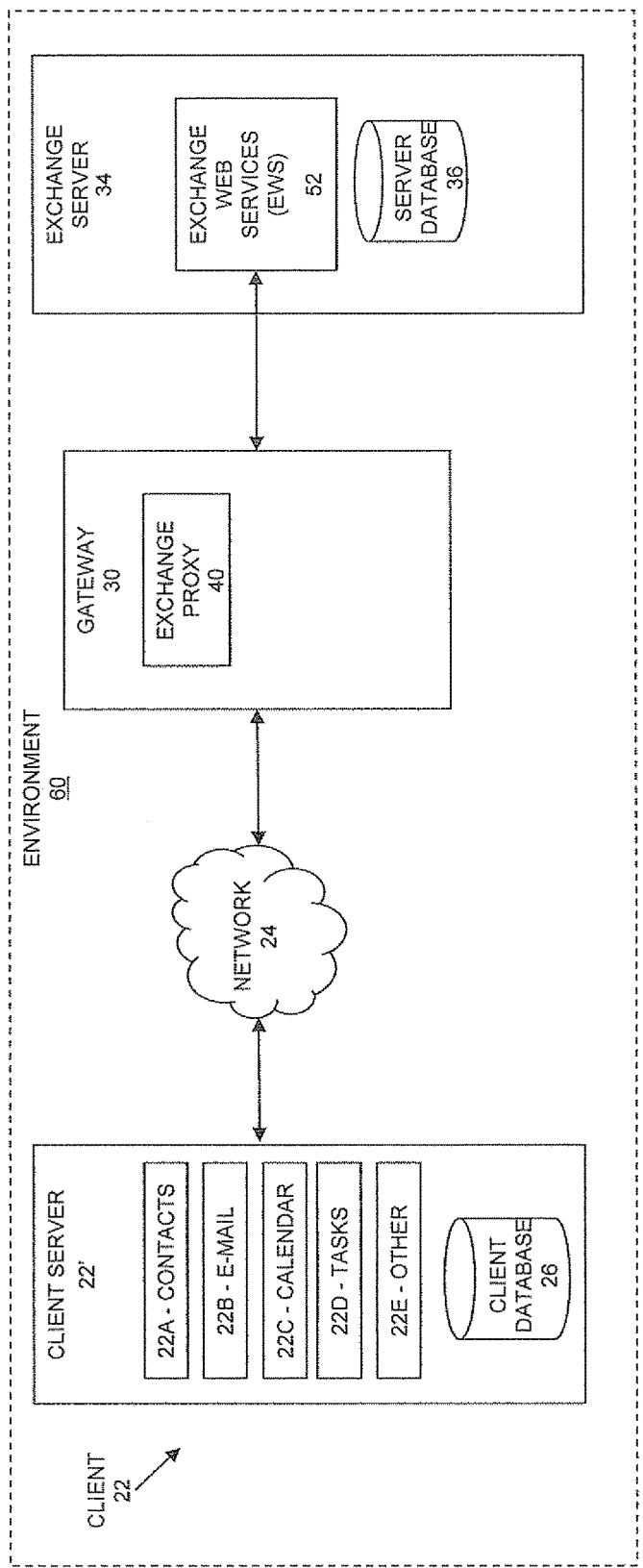
FIG. 1 is a diagram of an exemplary environment in which the present invention can operate.

The principles and operation of the system according to a present embodiment may be better understood with reference to the drawings and the accompanying description. A present invention creates and sends items using Exchange Web Services (EWS). The system facilitates avoiding creation and sending of duplicate items. In contrast to conventional implementations that send a single command to create and then perform subsequent processing of an item, a feature of the present embodiment is using two commands: a first command to create the item, and a second command to subsequently process the item. In a specific implementation, an EWS item's provided ChangeKey property is used to keep track of the EWS's reply from the server to the client, thereby avoiding duplicate item creation.

In both conventional operation and duplicate-free operation, the intention of the user and desired result is to process an item (for example, send an email message). However, instead of the obvious solution used in the conventional implementations of instructing a server to create and process the item, the innovative duplicate-free operation of the current embodiment instructs the server to only create the item, specifically not instructing the server to also process the item. In other words, a significant feature of duplicate-free operation is creating and saving, but not processing an item, even though the desired result is to process the item. Processing is then implemented in a separate, subsequent step.

In general, a method for duplicate-free operation for processing client requests for server operations, includes the steps of: Issuing a create request to create and save an item, wherein the item is to be processed. Checking if a confirmation is received in response to the issuing. If the confirmation is received, issuing a second command to process the item. If the confirmation fails to be received, issuing a find command to determine if the item has been created. If the find command determines that the item has been created, issuing the second command to process the item. If the find command fails to determine that the item has been created, issuing a create request. For clarity, the main exemplary embodiment of the current description is of a user sending an email. Alternative options are also described for a user creating a calendar event. Based on this description, one skilled in the art will be able to implement embodiments for additional applications, for example, tasks, meeting requests, contacts, and similar applications.

As an overview of an exemplary solution for sending messages, FindItem is used to locate an already created item with an opaque value. In this context, an opaque value is a value for an item, typically custom generated by the client, such as a randomly generated client item id (CID). The opaque is set as the item's ExtendedFieldURI's custom value when using CreateItem. The item is created and saved in a folder such as Drafts/Outbox. SendItem is used to send the saved item, resulting in no item with opaque existing.

As an overview of an exemplary solution for calendar items such as meetings and/or appointments, FindItem is used to locate an already created item with an opaque value. The opaque is set as the item's ExtendedFieldURI's custom value when using CreateItem. The item is created and saved in a folder such as the Calendar folder. UpdateItem's SendMeetingInvitationsOrCancellations is used to send the saved item while deleting the opaque.

FIG. 1 is a diagram of an exemplary environment 60 in which the present invention can operate. The environment 60 includes a client 22 (client computer), represented by the client server 22', operationally connected to a communications network 24, such as an organization's internal wired/wireless network, wide area network (WAN), or public network, for example, the Internet. Client server 22' is generally implemented as software on client 22 that implements the user application or component. Client server 22' is also referred to in the context of this document for simplicity as "client". Based on the context of use, one skilled in the art will understand to which component is being referred. The client includes a client database 26. A gateway (GW) 30 links to the network 24, and to an Exchange server 34 (network server). The Exchange server 34 may be structured to include Exchange Web Services (EWS) module 52 and a server database (DB) 36. Exchange server 34 is generally a network server, running one or more applications on one or more processors centrally located, distributed, or implemented in the cloud. Server database 36 is shown as a component of Exchange server 34, however one skilled in the art will realize that other implementations for server database 36 are possible. The EWS module is generally a server that complies/implements the EWS API, a typical example of which is a Microsoft Exchange Server that complies/implements the EWS API (a Microsoft protocol). One skilled in the art will realize that although the current description uses EWS as an example for implementation, the duplicate-free method can be implemented for similar clients, servers and user applications, such as processing client requests for server operations. Examples include, but are not limited to: an Exchange server implementing an EAS (Exchange Active Sync) protocol, and a corresponding client.

The client server 22' represents the client 22, typically including an application or component that desires items from the EWS 52. Components can make one or more requests issued from the client 22 to the server 34. The client 22 can include various processors, including those in a central processing unit (CPU), and including microprocessors, for performing the client server 22' functions and operations detailed herein, and storage media, either internal or associated therewith. The client server 22' also includes applications, components and/or modules, collectively referred to as "components," for example, for contacts 22A, e-mail 22B, calendar functions 22C, tasks 220, and other applications 22E. These client server components 22A-22E are, for example, corresponding components of Microsoft® Outlook®. Client application components (for example, contacts 22A, e-mail 22B, calendar functions 22C, tasks 22D, and other applications 22E) reside on the client 22 and access corresponding data stored on the Exchange server 34 (or more generally in an associated storage, such as server database 36). Components typically function with an associated item type. Item types include emails, calendar appointments, tasks, etc. For example, the item type e-mail 22B operates with email messages. Server 34 can store and function with a variety of item types. While a single client server 22' is shown, the client server 22' may be formed of multiple servers and/or components.

The gateway 30 is typically a computerized device, and includes an Exchange proxy 40. The gateway 30 provides credentials to each request, upon receiving each request, and sends each now-credentialed request to the Exchange server 34 for processing. The Exchange proxy 40 functions to perform proxying of Exchange Web Services requests, as well as handle the requests' required authentication process. While the gateway 30 is shown as a single device for clarity, gateway 30 can be formed of multiple computerized devices. Similarly, Exchange proxy 40 is shown as a single module for clarity, but can be implemented as at least one proxy.

The Exchange server 34 handles requests from the client 22, which the Exchange server receives with credentials, via the gateway 30. The Exchange server 34 includes an Exchange Web Services (EWS) protocol module 52 (referred to in this document simply as "EWS") for providing the functionality to enable client applications to communicate with the Exchange server 34. The Exchange server 34 includes various processors, including those in a central processing unit (CPU), and including microprocessors, for performing the server functions and operations detailed herein, and storage media, either internal or associated therewith. While a single Exchange server 34 is shown, the Exchange server 34 may be formed of multiple servers and/or components. An Exchange server's data is referred to as an "Exchange store", is associated with the EWS 52, and is the logical component storing items for the EWS 52. The Exchange store can be implemented in Exchange server 34, for example using server database 36.

Figures 2, 3:
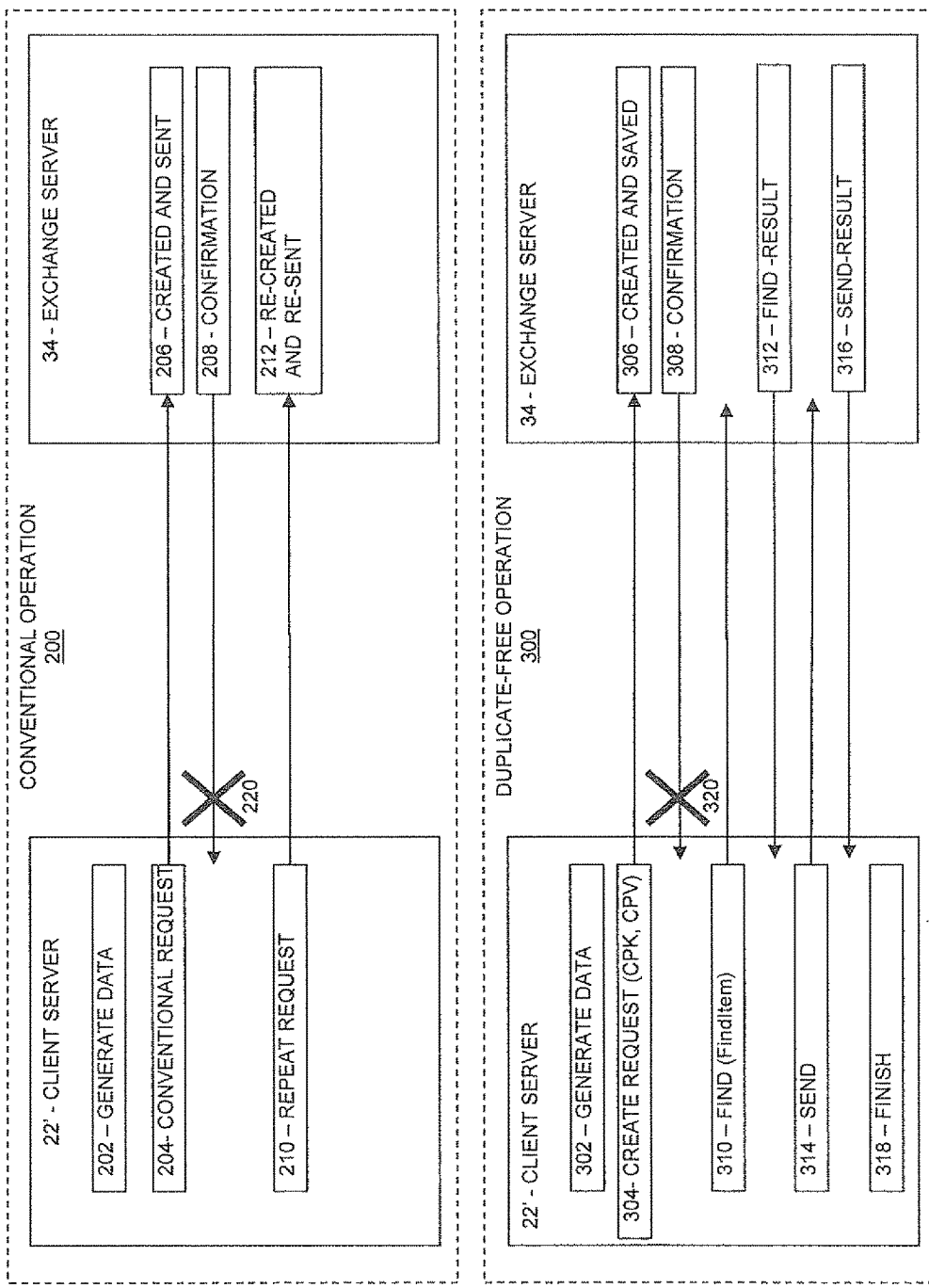
FIG. 2 is a diagram of conventional email creation and sending.
FIG. 3 is a diagram of an exemplary case of duplicate-free operation for email creation and sending.

Refer to FIG. 2, a diagram of conventional email creation and sending. For clarity in this figure, some details of the architecture of FIG. 1, such as Exchange proxy 40, are not shown. In general, in conventional implementations, such as conventional operation 200, a failure (shown as "x" 220), for example a communications failure, between the client 22 and the server 34 results in a duplicate email being created and sent. Environment 60 is especially prone to generating duplicates due to the use of Exchange proxy 40. In an architecture where there is no proxy, the client may be able to detect a communication problem, for example by getting an error message, and handle the failure without generating a duplicate message. However, when a proxy is used, gateway 30 may indicate to client server 22' that communications are operational (between gateway 30 and client server 22'), when in reality there has been a failure between gateway 30 and exchange server 34 (thus a failure between client server 22' and exchange server 34).

Conventional operation 200 starts with a user on client 22' generating data 202, for example generating email data by composing an email message and pressing "send" on the user interface for email application 22B. The client processes the email data and sends a conventional request 204 (including the email data) to server 34 to create and send a new email (based on the email data). Typically, a CreateItem command is used for sending the conventional request 204. CreateItem is a known Exchange Web Services (EWS) API for creating items on an EWS server. Typically, a CreateItem command for sending an email message will set the CreateItem MessageDisposition field to "Send" or "SendAndSaveCopy" (to save a copy of outgoing emails to a user's "sent mail" folder). Typically, a copy of the item (also referred to in the context of this document as an item's local representation) is stored on client 22', for example in local client database 26.

On server 34 the CreateItem conventional request 204 results in a new email message being created and sent 206, after which confirmation 208 is sent from the server 34 to the client 22'. In the illustrated case, there is a failure 220 and the confirmation 208 does not reach client 22'. In an example of conventional operations, when the conventional request 204 is sent, the client 22' activates a timer, or timeout period. If the client 22' does not receive the confirmation 208 by the end of the timeout period, the client 22' assumes the conventional request 204 has failed. When client 22' does not receive a confirmation that the request was executed, client 22' sends a repeat request 210 to server 34 to create and send a new email (based on the email data). Typically, repeat request 210 is similar to initial conventional request 204. On server 34, the CreateItem repeat request 210 results in a new email message being created (re-created) and sent 212. In this case, as the initial creation and sending 206 was successful, a duplicate email has now been re-created and re-sent 212. In a case where the confirmation 208 successfully reaches the client 22' (not shown), in other words there is no failure 220, the conventional operation 200 is successful, the item has been created and sent 206 on the server 34, the client 22' (and corresponding application/component 22A, e-22B, 22C, 22D, 22E) is aware of the success of the operation, and the repeat request 210 is not sent.

The below-described method and system provides an innovative solution to the problem of duplicate item creation, facilitating duplicate-free operation of item creation and sending using EWS.

One skilled in the art will be familiar with the technical details of EWS operation and appreciate the innovative features of the current embodiment. However, as an orientation to the reader, the following brief definitions are provided. Full definitions, details of operation, options, and implementation are available in published documentation.

In the context of this document, the term "item" generally refers to a set of data in the Exchange store, that is, data of interest, for example an email message, calendar appointment, or task associated with a user and stored by an EWS.

The ItemId element contains the unique identifier ("Id") and change key ("ChangeKey") of an item in the Exchange store. For example, <ItemId Id=" " ChangeKey=" "/>. ItemId identifies a specific item in the Exchange store. Id is case-sensitive; therefore, comparisons between Ids must be case-sensitive or binary. The ChangeKey property identifies a specific version of an item. The ChangeKey property gets the change key of an item.

Operations are also referred to in the field as calls or requests.

The FindItem operation (or simply "FindItem") searches for items, for example that are located in a user's mailbox or calendar in the Exchange store. FindItem provides many ways to filter and format how search results are returned to the caller. A successful response to FindItem can include an ItemId (ItemId including Id and ChangeKey).

The UpdateItem operation requires a ChangeKey if the ConflictResolution attribute is set to AutoResolve. AutoResolve is a default value. If the ChangeKey attribute is not included, the response will return a ResponseCode value equal to ErrorChangeKeyRequired.

The SendItem operation requires a ChangeKey to test whether the attempted operation will act upon the most recent version of an item. If the ChangeKey attribute is not included in the ItemId or if the ChangeKey is empty, the response will return a ResponseCode value equal to ErrorStaleObject.

The CreateItem operation is used to create items in the Exchange store, for example an email message or calendar appointment. In a CreateItem request, the "Items" field can include data generated by the user, for example the subject, body, and mailbox of an email message. The "MessageDisposition" field instructs the EWS what to do with the created message, for example "SendAndSaveCopy" in a folder given by the "DistinguishedFolderId" field such as a "drafts" folder. CreateItem can include optional fields such as ExtendedFieldURI element. A response to the CreateItem call includes an indication that the call was successful or an alternative result (such as error). The CreateItem response includes an ItemId (Id, ChangeKey) element.

The ExtendedFieldURI element can include fields such as DistinguishedPropertySetId, and PropertyName.

In the context of this document, the term "Custom Property Key" or "CPK" generally refers to an item's name and can be implemented as the ExtendedFieldURI name, such as set using the "PropertyName" field. In an exemplary implementation, the CPK can be any constant string that can be used for searching to find items on the EWS, for example "CheckPointCustomId". Preferably, the item's name should be a unique constant string in the context of the applications and API to allow searching on the item's name.

In the context of this document, the term "Custom Property Value" or "CPV" generally refers to an item's value. An items' value can be set using an opaque, or client item id (CID), and is preferably set as the ExtendedFieldURI "DistinguishedPropertySetId". The CPV is a unique value, typically arbitrarily (randomly) generated by the client. Thus, a CPK's value can be the associated CPV.

One skilled in the art will realize that other fields can be used for an item's name and value, and based on the current description will be able to choose appropriate fields and operations to implement the current embodiment for a particular application.

Refer to FIG. 3, a diagram of an exemplary case of duplicate-free operation 300 for email creation and sending of the current embodiment. Similar to FIG. 2, for clarity in this figure, some details of the architecture of FIG. 1, such as Exchange proxy 40, are not shown.

Duplicate-free operation 300 begins similar to conventional operation 200 with, a user on the client 22' generating data 302, for example generating email data by composing an email message and pressing "send" on the user interface for the email application 22B. The client 22' processes the email data and generates a create request 304 (including the email data). Typically, a copy of the item is stored on the client 22', for example in a local client database 26. In contrast to the conventional request 204, the create request 304 includes an item name and item value. A preferred implementation is to use the ExtendedFieldURI element to implement the item name with the "PropertyName" field set as a predefined CPK (for example "CheckPointCustomId") and to implement the item value with the "DistinguishedPropertySetId" field set as a CPV. CPV can be a client id (CID) that is arbitrarily generated by the client 22' for this create request 304.

The create request 304 has an additional significantly different feature from the conventional request 204. In both the conventional operation 200 and the duplicate-free operation 300, the intention of the user and desired result is to send the email message (based on the generated data 202 or 302). However, instead of the obvious solution used in the conventional request 204 of instructing the server 34 to create and send the email (for example, as described above setting the CreateItem MessageDisposition field to "Send"), the duplicate-free operation 300 create request 304 instructs the server 34 to only create the email, specifically not instructing the server 34 to also send the created email. The create request 304 preferably implements this innovative function at least in part by setting the CreateItem MessageDisposition field to "SaveOnly", and using a designated folder such as "drafts" to save the created email. In other words, this option will create and save, but not send, a new email message. The designated folder is typically on the server 34, for example in server database 36. One skilled in the art will realize that a folder other than "drafts" can be used to save the created email. In a preferred implementation, a hidden folder is created, that is, a folder that is not generally accessible to the user. Using a hidden folder for saving created items (prior to sending, updating, etc.) can help prevent a user from tampering with the duplicate-free operation 300.

Continuing with the current figure, the create request 304 is sent to the server 34 to create and save a new email (based on the email data). On the server 34 the CreateItem request 304 results in a new email message being created and saved 306, after which a confirmation 308 is sent from the server 34 to the client 22'. The confirmation 308 is similar to the confirmation 208, a standard response to every request (such as the conventional request 204 and the create request 304). In the current embodiment, the confirmation 308 can fail at any request—and the duplicate-free operation 300 will successful create a single item. In the illustrated case, there is a failure 320 (for example, a communications failure) and the confirmation 308 does not reach the client 22'. In contrast to the conventional operation 200 that would now send the repeat request 210, duplicate-free operation 300 sends a "find" command 310. Preferably, the general find command 310 is implemented using the EWS "FindItem" operation. This FindItem 310 uses the CPV (generally the item value) previously associated with the current email (generated data 302 and create request 304) to query the server 34 and return the ItemId (ItemId including Id and ChangeKey) for the current email. In other words, FindItem is used by the client 22' with the CPK's value set to the CPV to query the server 34.

In this case, the email message (generally the item) has already been created on the server, so the FindItem 310 is successful and the server 34 returns a find-result 312 including the email's associated ItemID (including Id and ChangeKey). The client 22' uses the email's ChangeKey to issue a "send" command 314. Note that a send command is used in the current example of the item being an email message. If the item is a different type of item, such as a calendar item, the appropriate command would be used, such as an "update" command.

The server 34 receives the send command 314 and sends the previously saved email message from the drafts folder. The server 34 then returns a send-result 316 to the client 22'. If there is a second failure (not shown) and after a timeout period the client 22' does not receive the send-result 316, the client may repeat issuing the send-command 314. This case is detailed below in reference to FIG. 4, in particular subsequent processing steps (SEND 504A, UPDATE 504B, etc.) based on an item's value (CPV) will fail—a desired result to avoid duplicates as the item has already been sent and will not be sent again.

Upon receiving the send-result 316, the client may perform a variety of finishing operations 318. Typically, finish operations 318 include deleting the local copy of the email message stored temporarily on the client (for example, in the client database 26. Depending on the preferences, implementation, and/or operation of the client 22', the local copy of the email may be saved, for example to facilitate future "gets" of an exact copy of the email from the server 34. Optionally and/or alternatively, the ItemId of the item can be stored on the client 22' and the associated Id and ChangeKey can be used to re-get the item.

Figure 4:
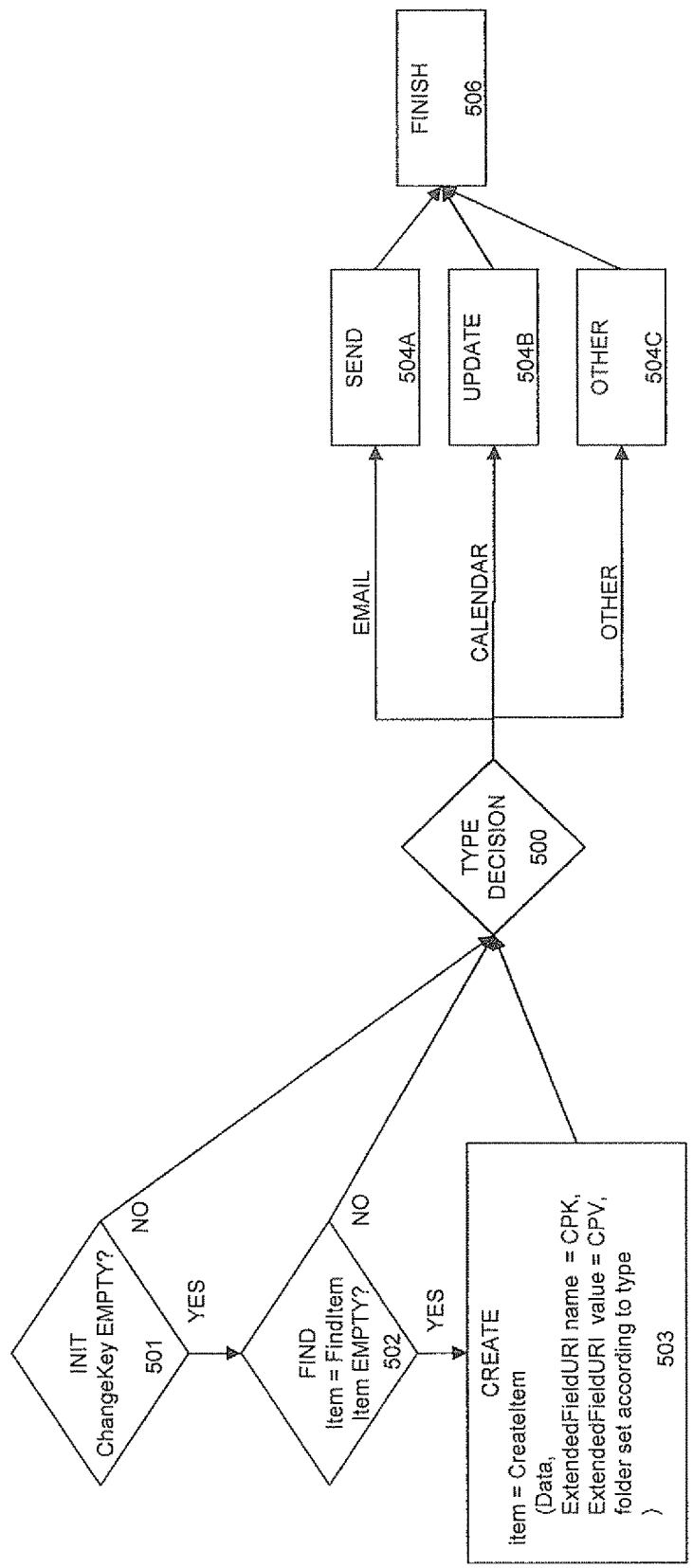
FIG. 4 is a flowchart of states and transitions for duplicate-free operation.

Refer now to FIG. 4, a flowchart of states and transitions for duplicate-free operation. An initialization state is shown as INIT 501 where the client 22' checks if there is a ChangeKey in an item's local representation. The INIT 501 state is particularly useful as the initial processing state after a failure. If there is a current ChangeKey, in other words the ChangeKey is not empty, then a current item has been created (and saved) on the server 34, but possibly not yet sent/updated/etc. (as appropriate for the particular item type), and the method continues to a TYPE DECISION state (block 500).

In the INIT 501 state, if there is not a current ChangeKey, in other words, the ChangeKey is empty, then the client 22' does not know if a current item has been created on the server 34. Either the item may have been created on the server, but the confirmation 308 not received by the client 22' or the item may not yet have been created on the server 34. In either case, the method continues to a FIND state (block 502).

INIT 501 state can be represented in pseudo code as:

```
INIT
    If (ChangeKey is empty)
        nextState = FIND
    else
        nextState = TYPE DECISION
```

A finding state is shown as FIND 502 where the client 22' sends a find command (typically using the FindItem operation) to the server 34. The FIND 502 state is particularly useful as a fail-safe step in a case where an item has been created, but the client 22' does not receive a response from the server 34 confirming creation of the item, such as the initial processing state after a failure. FindItem uses the item's name and item's value (CPK's value set to the CPV) to query the server 34. If the server 34 returns a result (for example a find command result including the ItemId [ItemId including Id and ChangeKey] for the current item), then the current item has been created (and saved) on the server 34, but not yet sent/updated/etc., the ChangeKey for the item's local representation is updated, and the method continues to the TYPE DECISION state (block 500).

If FindItem does not return a result, in other words the result of FindItem is empty, then the item has not yet been created on the server 34, and the method continues to a CREATE state (block 503).

FIND 502 can be represented in pseudo code as:

```
FIND
    item = FindItem where CPK's value is CPV
    if (item is empty) // no result found
        nextState = CREATE
    else
        nextState = TYPE DECISION
```

A creating state is shown as CREATE 503 where the client 22' generates a CreateItem command and then sends the CreateItem command to the server 34. The CreateItem command (for example the create request 304) includes required data (for example the generated data 302), an item name (for example setting the ExtendedFieldURI PropertyName field set as a predefined CPK) (for example "CheckPointCustomId") and an item value (for example setting the ExtendedFieldURI DistinguishedPropertySetId field set as a CPV. CPV can be a client id (CID) that is randomly generated by the client 22'.

The generated CreateItem command is sent from the client 22' to the server 34. Similar to the above-described example of FIG. 3, on the server 34 the CreateItem command (the create request 304) results in a new item (in this case email message) being created and saved 306, after which confirmation 308 is sent from the server 34 to the client 22'. In contrast to conventional operation 200 that sends a single conventional request 204 to create and then perform subsequent processing (in this case sending the email message) the current embodiment uses two commands. The first command is create request 304.

The client 22' then checks if a successful response (the confirmation 308) has been received from the server 34 to the previous create request 304. In a case of normal operation, where there is no failure 320, in response to the create request 304, the confirmation 308 is received by the client 22'. The client now knows that the creation and saving 306 on the server 34 has been successful, has a corresponding ItemId, typically updates any associated local databases, and the method continues to the TYPE DECISION state (block 500) to issue the second command (for sending the email, updating the calendar appointment, etc.).

If a successful response (the confirmation 308) is not received by the client 22' from the server 34, the client 22' does not know if the item has been created on the server 34, nor has a corresponding ItemId, so the method continues to the FIND state (block 502).

CREATE 503 can be represented in pseudo code as:

```
CREATE
    item = CreateItem with:
        required data,
        CPK set as ExtendedFieldURI name,
        value for CPK is CPV,
        saved folder set according to type
    nextState = TYPE DECISION
```

A type decision state is shown as TYPE DECISION 500. Typically, a type decision is made by the client 22' based on the item type (email, calendar appointment, etc.) of the item currently being processed, to determine the appropriate subsequent processing (command) to use for the next processing state of the item being processed. In other words, the client decides based on the current item type the appropriate command to send from the client 22' to the server 34 in order to proceed with duplicate-free processing of the previously created and stored item. In a case where the item is an email that has previously been created in the CREATE state (block 503), the TYPE DECISION 500 state for email results in the method continuing at a SEND state (block 504A). In other words, the client 22' issues a send command to the server 34 to send the previously created email message.

Similarly, subsequent processing of calendar items proceeds from the TYPE DECISION 500 state to use an UPDATE command (UPDATE state, block 504B) to set calendar invitations, send invitations, send cancellations, etc. In the case of calendar items, the server 34 also can delete the CPK/CPV from the calendar item. The current embodiment can also be used for other item types, other than emails and calendar items, by using the corresponding appropriate subsequent processing, as indicated by the method continuing from the TYPE DECISION 500 state to an OTHER state (block 504C).

A feature of the current embodiment is that in a case where an item has already been subsequently processed (email message sent, calendar item updated, etc.) the subsequent processing steps (SEND 504A, UPDATE 504B, etc.) based on an item's value (CPV) will fail—a desired result to avoid duplicates as the item has already been subsequently processed. This case can occur when there is a second failure (not shown in FIG. 3) and the client 22' does not receive the send-result 316. The method continues to the INIT 501 state, repeats issuing the send command 314. In this case, the method fails subsequent processing (504A, 504B, 504C), and re-issues send-result 316, which may defer from the initial send result as processing has already occurred.

A finishing state is shown as FINISH 506. The FINISH 500 state can include any additional or optional processing on the client 22' or the server 34 to complete the necessary processing of the current item. Depending on the item type, system requirements, and application implementation, there can be zero, one, or more actions taken in the FINISH 506 state.

For example, in the case of sending an email message, when the user initiates sending the email (typically by clicking a "send" button on the email 22B graphical user interface), a copy of the email message is preferably stored in the local client database 26. The client 22' adds to the email message a CPV and issues a CreateItem command. In the FINISH 506 state, after successfully sending the email message, the local copy of the email message is deleted from the local client database 26. Alternatively, the local copy of the email message is not deleted from the client database 26, instead being retained for future use. In the case where the local copy of the email message is saved on the client 22', an exact copy is stored on the server 34 (for example in the server database 36) and the client 22' can use the "Get" command with the ItemId to re-get the email message from the server 34.

A method of the present embodiment can be used for functions in addition to item creation and processing, such as creating unique folders. In this case, the method states (FIND 502, CREATE 503, UPDATE 504B) can be used to create and activate folders instead of items. Or described from another perspective, the item of the current embodiment is a folder.

Another use of the present embodiment is to ensure single updates on Exchange, setting an item value (opaque field) when doing updates, and removing the item value (opaque) when the update has been completed.

Figure 5:
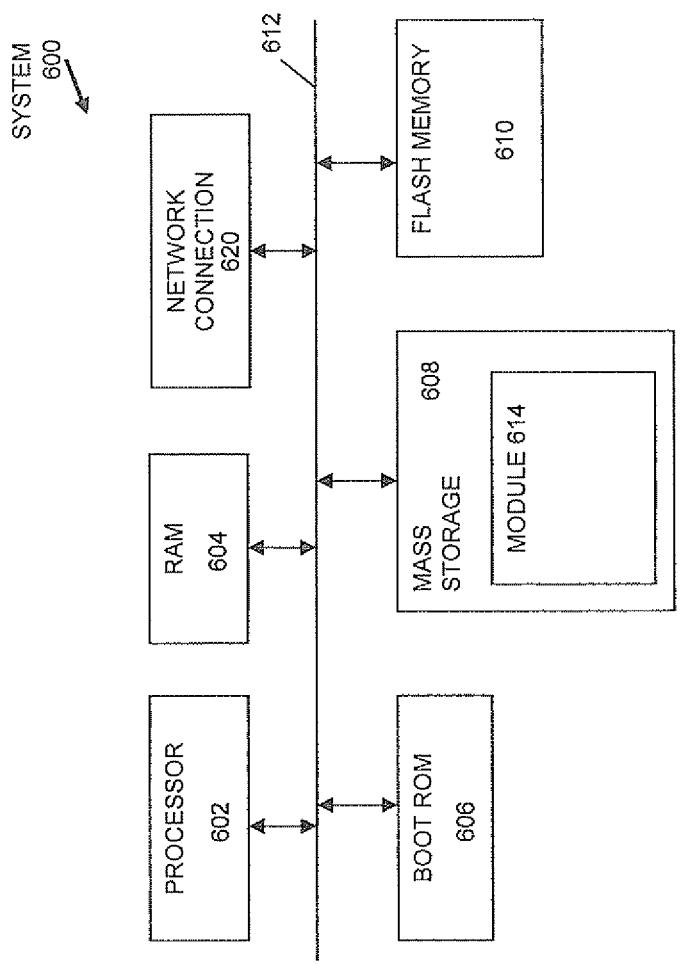
FIG. 5 is a high-level partial block diagram of an exemplary system configured to implement client or Exchange server of the present invention.

FIG. 5 is a high-level partial block diagram of an exemplary system 600 configured to implement client 22 or Exchange server 34 of the present invention. System (processing system) 600 includes a processor 602 (one or more) and four memory devices: a RAM 604, a boot ROM 606, a mass storage device (hard disk) 608, and a flash memory 610, all communicating via a common bus 612. A module (processing module) 614 is shown on mass storage 608, but as will be obvious to one skilled in the art, could be located on any of the memory devices.

Mass storage device 608 is a non-limiting example of a computer-readable storage medium bearing computer-readable code for implementing the methodology described herein. Other examples of such computer-readable storage media include read-only memories such as CDs bearing such code.

System 600 may have an operating system stored on the memory devices, the ROM may include boot code for the system, and the processor may be configured for executing the boot code to load the operating system to RAM 604, executing the operating system to copy computer-readable code to RAM 604 and execute the code.

Network connection 620 provides communications to and from system 600. Typically, a single network connection provides one or more links, including virtual connections, to other devices on local and/or remote networks. Alternatively, system 600 can include more than one network connection (not shown), each network connection providing one or more links to other devices and/or networks.

System 600 can be implemented as a server or client respectively connected through a network to a client or server.

Note that a variety of implementations for modules and processing are possible, depending on the application. Modules are preferably implemented in software, but can also be implemented in hardware and firmware, on a single processor or distributed processors, at one or more locations. The above-described module functions can be combined and implemented as fewer modules or separated into sub-functions and implemented as a larger number of modules. Based on the above description, one skilled in the art will be able to design an implementation for a specific application.

Note that the above-described examples, numbers used, and exemplary calculations are to assist in the description of this embodiment. Inadvertent typographical errors, mathematical errors, and/or the use of simplified calculations do not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. A method for processing client requests for server operations, comprising the steps of:
   (a) issuing a create request to create and save an item, wherein said item is to be processed;
   (b) checking if a confirmation is received in response to said issuing, wherein said confirmation is that said item has only been created and saved;
   (c) if said confirmation is received, issuing a second command to process said item;
   (d) else issuing a find command to determine if said item has been created; and
   (e) if said find command determines that said item has been created, issuing said second command to process said item, else repeating said issuing a create request.

2. The method of claim 1 wherein said create request includes an item name and item value.

3. The method of claim 2 wherein said item name is selected from the group consisting of:
   (a) a constant string;
   (b) a constant string unique in context of use of said item name;
   (c) an ExtendedFieldURI PropertyName; and
   (d) a Custom Property Key (CPK).

4. The method of claim 2 wherein said item value is selected from the group consisting of:
   (a) a unique value arbitrarily generated for said create request;
   (b) an ExtendedFieldURI DistinguishedPropertySetId;
   (c) a Custom Property Value (CPV); and
   (d) a CPV randomly generated as a client id (CID).

5. The method of claim 1 wherein:
   (a) said confirmation includes an item identification (ItemId),
   (b) said second command includes said ItemId, and
   (c) if said find command determines that said item has been created, receiving a find command result including said ItemId.

6. The method of claim 1 wherein said item is an email message and said second command is a send operation.

7. The method of claim 1 wherein said item is a calendar item and said second command is an update operation.

8. The method of claim 1 wherein said issuing is from a client to an Exchange Web Services (EWS) server.

9. A system comprising:
   (a) a processing system containing one or more processors, said processing system being configured for:
      (i) issuing a create request to create and save an item, wherein said item is to be processed;
      (ii) checking if a confirmation is received in response to said issuing, wherein said confirmation is that said item has only been created and saved;
      (iii) if said confirmation is received, issuing a second command to process said item;
      (iv) else issuing a find command to determine if said item has been created; and
      (v) if said find command determines that said item has been created, issuing said second command to process said item, else repeating said issuing a create request.

10. The system of claim 9 wherein said create request includes an item name and item value.

11. The system of claim 10 wherein said item name is selected from the group consisting of:
    (a) a constant string;
    (b) a constant string unique in context of use of said item name;
    (c) an ExtendedFieldURI PropertyName; and
    (d) a Custom Property Key (CPK).

12. The system of claim 10 wherein said item value is selected from the group consisting of:
    (a) a unique value arbitrarily generated for said create request;
    (b) an ExtendedFieldURI DistinguishedPropertySetId;
    (c) a Custom Property Value (CPV); and
    (d) a CPV randomly generated as a client id (CID).

13. The system of claim 9 wherein:
    (a) said confirmation includes an item identification (ItemId),
    (b) said second command includes said ItemId, and
    (c) if said find command determines that said item has been created, receiving a find command result including said ItemId.

14. The system of claim 9 wherein said item is an email message and said second command is a send operation.

15. The system of claim 9 wherein said item is a calendar item and said second command is an update operation.

16. The system of claim 9 wherein said issuing is from a client to an Exchange Web Services (EWS) server.

17. A non-transitory computer-readable storage medium having embedded thereon computer-readable code for processing client requests for server operations, the computer-readable code comprising program code for:
    (a) issuing a create request to create and save an item, wherein said item is to be processed;
    (b) checking if a confirmation is received in response to said issuing, wherein said confirmation is that said item has only been created and saved;
    (c) if said confirmation is received, issuing a second command to process said item;
    (d) else issuing a find command to determine if said item has been created; and
    (e) if said find command determines that said item has been created, issuing said second command to process said item, else repeating said issuing a create request.

* * * * *